UNITED STATES PATENT OFFICE.

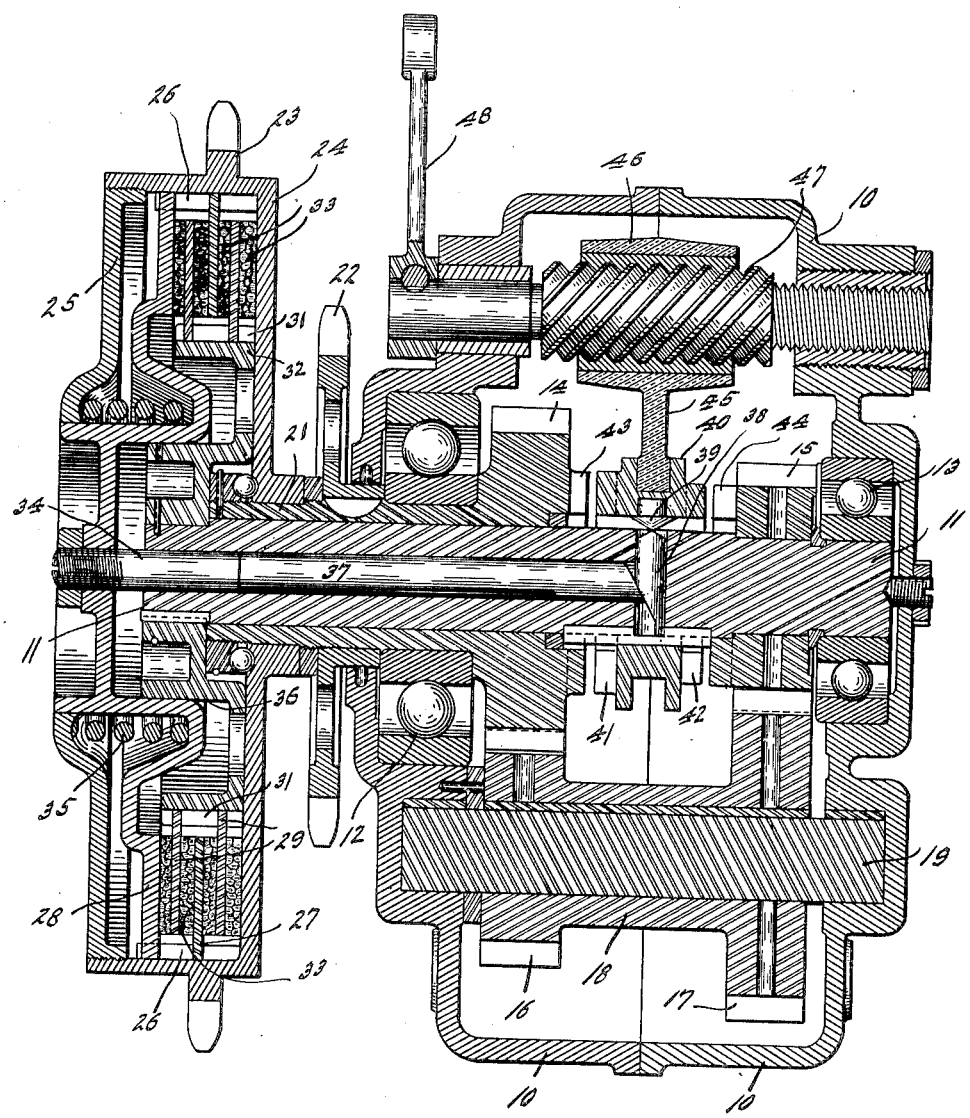

FRED W. SPACKE, DALMAR T. BROWNLEE, AND WILLIAM SPACKE, OF INDIANAPOLIS, INDIANA, ASSIGNORS TO THE F. W. SPACKE MACHINE COMPANY, OF INDIANAPOLIS, INDIANA, A CORPORATION OF INDIANA.

CHANGE-SPEED GEARING.

1,099,520. Specification of Letters Patent. Patented June 9, 1914.

Application filed August 14, 1912. Serial No. 715,127.

*To all whom it may concern:*

Be it known that we, FRED W. SPACKE, DALMAR T. BROWNLEE, and WILLIAM SPACKE, citizens of the United States, residing at Indianapolis, in the county of Marion and State of Indiana, have invented a new and useful Change-Speed Gearing, of which the following is a specification.

It is the object of our invention to provide a combination clutch and variable speed gearing wherein the clutch and the gears are controlled in common. Our improved clutch and gearing is particularly designed for use between the motor and driving wheel of a motor cycle or light parcel delivery vehicle.

The various novel features of our invention will appear from the description and drawing and will be particularly pointed out in the claims.

The single figure of the drawing is a longitudinal section through a gearing embodying our invention.

The casing 10 is preferably made of two parts, bolted together. A central shaft 11 is mounted in this casing in ball bearings 12 and 13. Two gears 14 and 15, of different sizes, are rotatably mounted on the shaft 11 and mesh with gears 16 and 17, respectively, fixed on a counter-shaft 18. This counter-shaft is mounted on a pin 19 extending between the two halves of the casing 10. The gear 14 is integral with or otherwise fixed in relation to a sleeve 21, on the shaft 11, on which sleeve a sprocket wheel or other power-transmitting device 22 is fixed and a larger sprocket wheel or other power-transmitting device 23 is rotatably mounted. The sprocket wheel 23 is connected to the motor or other source of power, and the sprocket wheel 22 to the driving wheel of a motor cycle or other driven mechanism; or vice versa. The sprocket wheel 23 is formed on the exterior of a casing 24 having a removable cover 25. The inside of the casing 24 is provided with inwardly extending teeth 26, similar to gear teeth, which engage in notches in the peripheries of clutch disks 27 and 28. Alternating with the disks 27 and 28 and the casing 24 are the coöperating clutch disks 29, the inner edges of which are notched to receive teeth 31 on the periphery of a spider 32 fixed on the end of the shaft 11. The disks 27, 28, and 29 are spaced apart by woven asbestos 33 or other suitable clutch facing, and are movable toward and from the casing 24 along the teeth 26 and 31. The disk 28 extends inwardly, being fastened at its center to one end of a rod 34 freely mounted in a longitudinal opening in the shaft 11, and is pressed toward the casing 24 by a compression spring 35 mounted between it and the cover 25; the disk 28 and cover 25 may be shaped to form a pocket for the spring. If desired, the plate 28 may have a sliding bearing on a shoulder 36 formed on the spider 32. When the spring 35 is expanded, it clamps the disks 27, 28, and 29, the casing 24, and the asbestos 33 all firmly together, so that the spider 32 and shaft 11 rotate with the wheel 23. The end of the rod 34 which projects into the opening in the shaft 11 bears against one end of, or may be integral with, an alined rod 37, also located in such opening. The other end of the rod 37 is cut off obliquely, and coöperates with a correspondingly oblique surface on a pin 38 which is slidable in a transverse opening in the shaft 11. The projecting end of the pin 38 is wedge shaped, and coöperates with a pointed plug 39 set in the inner face of a gear shifter ring 40 movable along a spline on the shaft 11. The plug 39 and pin 38 coöperate as double acting cams. When the ring 40 is in its central position, as shown, it pushes the rod 34 and disk 28 to the left to compress the spring 35 and relieve the pressure on the clutch plates 27, 28, and 29, thus releasing the clutch. When the ring 40 is moved either way from its central position, it allows the pin 38 to slide transversely and the rods 37 and 34 to slide longitudinally of the shaft, so that the spring 35 may lock the clutch.

The ring 40 is provided on its opposite faces with teeth 41 and 42, which engage corresponding teeth 43 and 44 on the gears 14 and 15 when said ring is moved toward said two gears respectively. The ring 40 is grooved in its periphery to receive a shifter fork 45, the head 46 of which is in screw engagement with a shifter screw 47 operable by the operating lever 48. When the lever 48 is moved in one direction or the other from its central position, it throws in both the proper gears and the clutch, releasing both when it is returned to its middle position. If the movement is such that the teeth 41 and 43 are thrown into engagement, power is transmitetd from the sprocket wheel 23 through the clutch, the spider 32, the shaft 11, the ring 40, the gear 14, and the sleeve 21 to the sprocket wheel 22, which parts all rotate in unison. If the movement of the lever 48 is such that the teeth 42 and 44 are thrown into engagement, power is transmitted from the sprocket wheel 23 through the clutch, the spider 32, the shaft 11, the gear 15, the gear 17, the countershaft 18, the gear 16, the gear 14, and the sleeve 21 to the sprocket wheel 22, which now operates at a lower speed than does the sprocket wheel 23.

Our invention is not limited to the precise arrangement shown, and we aim to cover all modifications of such arrangement which do not involve a departure from the spirit and scope of our invention as set forth in the following claims.

What we claim is:

1. In combination, a shaft, two wheels rotatably mounted on said shaft, a speed-reducing gearing, means for connecting one of said wheels to said shaft, means for connecting the other of said wheels to said shaft either directly or through said speed reducing gearing, and a common operating means for said two connecting means.

2. In combination, a shaft, two wheels rotatably mounted on said shaft, a clutch between one of said wheels and said shaft, a spring tending to set said clutch, two gears of different sizes rotatably mounted on said shaft, one of said gears being fixed to the other of said wheels, a countershaft, gears on said countershaft permanently meshing with the aforesaid gears, means for connecting either of the first named two gears rigidly to the shaft on which they are mounted, and means operated by said last named means for controlling said spring.

3. In combination, a shaft, two wheels rotatably mounted on said shaft, a clutch between one of said wheels and said shaft, two gears of different sizes rotatably mounted on said shaft, one of said gears being fixed to the other of said wheels, a countershaft, gears on said countershaft permanently meshing with the aforesaid gears, means for connecting either of the first named two gears rigidly to the shaft on which they are mounted, and means operated by said last named means for controlling said clutch.

4. In combination, a shaft, two wheels rotatably mounted on said shaft, a clutch between one of said wheels and said shaft, a spring tending to set said clutch, two gears of different sizes rotatably mounted on said shaft, one of said gears being fixed to the other of said wheels, a countershaft, gears on said countershaft permanently meshing with the aforesaid gears, means for connecting either of the first named two gears rigidly to the shaft on which they are mounted, and means operated by said last named means for overcoming said spring to release the clutch when neither gear is connected to the shaft and for allowing the spring to set the clutch when either gear is connected to the shaft.

5. In combination, a shaft, a sleeve rotatably mounted on said shaft, a gear fixed on said sleeve, a gear rotatably mounted on said shaft, said two gears being of different sizes, a back gearing permanently connecting said first two gears, a member rotatable with the shaft and movable longitudinally of the shaft relatively to said first two gears, said member and each of said first two gears having interlocking parts which are controlled by such movement, a power wheel, a clutch between said power wheel and said shaft, and means for controlling said clutch by the movement of the member movable with the shaft.

6. In combination, a shaft, two gears rotatably mounted on said shaft, a power-transmitting device connected to one of said gears, a member located between said two gears, said member being movable longitudinally of the shaft but rotatable with the shaft and having parts which interlock it to either of said gears when it is moved toward that gear, a pair of gears fixed together and permanently meshing with the aforesaid two gears respectively, a second power-transmitting device, a clutch between said second power-transmitting device and the shaft, and means for controlling such clutch by the movement of the member between the two gears on the shaft.

7. In combination, a shaft, two gears rotatably mounted on said shaft, a power-transmitting device connected to one of said gears, a member located between said two gears, said member being movable longitudinally of the shaft but rotatable with the shaft and having parts which interlock it to either of said gears when it is moved toward that gear, a pair of gears fixed together and permanently meshing with the aforesaid two gears respectively, a second power-transmitting device, a clutch between said second power-transmitting device and the shaft, a spring tending to set the clutch, and means operated by the movement of the member on the shaft to its middle portion for releasing said clutch from said spring.

8. In combination, a shaft, a gear rotatably mounted on said shaft, a second gear mounted on said shaft, a member mounted on said shaft, said member being movable longitudinally of the shaft but rotatable with the shaft, a back gearing for connecting said first two gears, said movable member when in one of its extreme positions connecting said first gear to rotate with the shaft and when in its other extreme position connecting the shaft to the first gear through the second gear and the back gearing, a power-transmitting device connected to one of said first two gears, a second power-transmitting device, a clutch between said second power-transmitting device and shaft, and means for controlling said clutch by the movement of said movable member on the shaft.

9. In combination, a shaft, a gear rotatably mounted on said shaft, a second gear mounted on said shaft, a member mounted on said shaft, said member being movable longitudinally of the shaft but rotatable with the shaft, a back gearing for connecting said first two gears, said movable member when in one of its extreme positions connecting said first gear to rotate with the shaft and when in its other extreme position connecting the shaft to the first gear through the second gear and the back gearing, a power-transmitting device connected to one of said first two gears, a second power-transmitting device, a clutch between said second power-transmitting device and shaft, a spring tending to set said clutch, and means operated by movement of the movable member on the shaft to its middle position for overcoming said spring and thereby releasing said clutch.

10. In combination, a shaft, two wheels rotatably mounted on said shaft, a clutch between one of said wheels and said shaft, a spring tending to set said clutch, two gears of different sizes rotatably mounted on said shaft, one of said gears being fixed to the other of said wheels, a countershaft, gears on said countershaft permanently meshing with the aforesaid two gears, means for connecting either of the first named two gears rigidly to the shaft on which they are mounted, and means located within said shaft and operated by said connecting means for overcoming said spring.

11. In combination, a shaft, two wheels rotatably mounted on said shaft, a clutch between one of said wheels and said shaft, two gears of different sizes rotatably mounted on said shaft, one of said gears being fixed to the other of said wheels, a countershaft, gears on said countershaft permanently meshing with the aforesaid two gears, means for connecting either of the first named two gears rigidly to the shaft on which they are mounted, and means located within said shaft and operated by said connecting means for controlling said clutch.

12. In combination, a shaft, two gears rotatably mounted on said shaft, a power-transmitting device connected to one of said gears, a member located between said two gears, said member being movable longitudinally of the shaft but rotatable with the shaft and having parts which interlock it to either of said gears when it is moved toward that gear, a pair of gears fixed together and permanently meshing with the aforesaid two gears respectively, a second power-transmitting device, a clutch between said second power-transmitting device and the shaft, and means located within the shaft and operated by the movement of said movable member on the shaft to control said clutch.

In witness whereof, we have hereunto set our hands and seals at Indianapolis, Indiana, this sixth day of August, A. D. one thousand nine hundred and twelve.

FRED W. SPACKE. [L. S.]
DALMAR T. BROWNLEE. [L. S.]
WILLIAM SPACKE. [L. S.]

Witnesses:
  G. B. SCHLEY,
  FRANK A. FAHLE.